United States Patent
Nishida et al.

(10) Patent No.: US 7,775,336 B2
(45) Date of Patent: Aug. 17, 2010

(54) FRICTION ENGAGEMENT DEVICE

(75) Inventors: Masaaki Nishida, Anjo (JP); Satoru Kasuya, Hazu (JP); Masashi Kito, Anjo (JP); Yoshihisa Yamamoto, Anjo (JP); Akitomo Suzuki, Anjo (JP); Masato Fujikawa, Toyota (JP); Ryuji Ibaraki, Nishikamo-gun (JP); Masatoshi Adachi, Nishikamo-gun (JP); Tsuyoshi Mikami, Nissin (JP); Hideo Ono, Toyota (JP)

(73) Assignees: Aisin AW Co., Ltd., Anjo (JP); Toyota Jidosha Kabushiki Kaisha, Toyota (JP); Aishin Kako Kabushiki Kaisha, Toyota (JP)

( * ) Notice: Subject to any disclaimer, the term of this patent is extended or adjusted under 35 U.S.C. 154(b) by 584 days.

(21) Appl. No.: 11/703,793

(22) Filed: Feb. 8, 2007

(65) Prior Publication Data

US 2007/0199789 A1  Aug. 30, 2007

(30) Foreign Application Priority Data

Feb. 24, 2006 (JP) ............................. 2006-049360

(51) Int. Cl.
*F16D 13/72* (2006.01)
*F16D 13/74* (2006.01)
(52) U.S. Cl. ............... 192/70.12; 192/70.2; 192/113.36
(58) Field of Classification Search ............. 192/70.12, 192/113.36
See application file for complete search history.

(56) References Cited

U.S. PATENT DOCUMENTS 5,964,329 A * 10/1999 Kawaguchi et al. .... 192/113.36
6,283,265 B1 * 9/2001 Hirayanagi et al. ...... 192/70.12
6,702,088 B2 * 3/2004 Kitaori et al. .......... 192/113.36
7,073,650 B2    7/2006 Fabricius et al.
2006/0049017 A1 * 3/2006 Furuichi .................. 192/30 W
2007/0017769 A1 * 1/2007 Mordukhovich et al. ..................... 192/113.36

FOREIGN PATENT DOCUMENTS

EP    0267027 A2 *  5/1988

(Continued)

OTHER PUBLICATIONS

Foreign Office Action dispatched Mar. 23, 2010 (with partial translation).

*Primary Examiner*—Rodney H Bonck
(74) *Attorney, Agent, or Firm*—Oliff & Berridge, PLC

(57) ABSTRACT

Lubricating oil supply holes are drilled into a first member that is fitted to a plurality of first annular plates by a spline. Of splines to which each lubricating oil supply hole corresponds, lubricating oil grooves provided in the plurality of first annular plates do not overlap the splines on at least one of the front and rear surfaces of the first annular plates, and therefore lubricating oil flowing out of the lubricating oil supply holes is dispersed in a circumferential direction and flows from the inner periphery to the outer periphery of the first annular plates, rather than gathering in each lubricating oil groove and flowing in an outer peripheral direction. As a result, a force generated by an axial lubricating oil flow, which acts in a direction for causing the second annular plates to contact friction materials on the first annular plates, is suppressed, leading to a reduction in drag torque.

11 Claims, 11 Drawing Sheets

FOREIGN PATENT DOCUMENTS

| | | |
|---|---|---|
| JP | A-61-175326 | 8/1986 |
| JP | U-61-129930 | 8/1986 |
| JP | U-5-087341 | 11/1993 |
| JP | A 2000-145819 | 5/2000 |
| JP | A-2004-19945 | 1/2004 |

* cited by examiner

FRICTION ENGAGEMENT DEVICE

CROSS-REFERENCE TO RELATED APPLICATION

The disclosure of Japanese Patent Application No. 2006-049360 filed on Feb. 24, 2006 including the specification, drawings and abstract is incorporated herein by reference in its entirety.

BACKGROUND

The present invention relates to a friction engagement device.

In a conventional automatic transmission of an automobile or the like, a predetermined rotary element of a planetary gear device is connected to an input shaft by a clutch or subjected to rotation restriction by a brake in order to achieve a desired shift speed.

In a clutch and a brake, a friction plate adhered on both the front and rear surface with a plurality of friction materials and a separator plate are pressed together such that relative rotation between a first member and a second member spline-fitted to the friction plate and separator plate, respectively, is restricted. To remove frictional heat generated during the period from contact between the friction materials and separator plate to total restriction of relative rotation, and to prevent wear on the friction materials, a plurality of lubricating oil grooves are provided radially between adjacent friction materials. Lubricating oil is supplied to the plurality of lubricating oil grooves through lubricating oil supply holes drilled in the first member.

Japanese Patent Application Publication No. JP-A-2000-145819 (pages 3 and 4, FIGS. 1, 2, and 3) describes an invention in which a plurality of lubricating oil supply holes 12 drilled into a hub 8 (first member) of a wet type multiplate clutch 20 and a plurality of through oil grooves 11 (lubricating oil grooves) provided radially in both the front and rear surfaces of a friction plate 7 spline-fitted to the hub 8 are caused to face each other to reduce drag torque generated as a result of the viscosity of the lubricating oil used in the wet type multiplate clutch 20.

SUMMARY

According to the description provided in paragraph [0020] of Japanese Patent Application Publication No. JP-A-2000-145819, in the wet type multiplate clutch described above, the lubricating oil that flows through the through oil grooves 11 flows in the manner illustrated by arrow A in FIG. 3 of Japanese Patent Application Publication No. JP-A-2000-145819, thereby improving the dischargeability of the oil. At this time, the lubricating oil supply holes 12 in the hub 8 face an opening portion on the inner peripheral edge side of the through oil grooves 11, and therefore the lubricating oil flows more smoothly. As a result, the viscosity shearing resistance of the oil generated between the friction surfaces of the friction plate 7 and a separator plate 3 is reduced. Using this principle, drag torque is reduced.

However, when the plurality of lubricating oil supply holes 12 and the plurality of through oil grooves 11 are caused to face each other, as in the invention described in Japanese Patent Application Publication No. JP-A-2000-145819, the lubricating oil that flows out of each lubricating oil supply hole 12 concentrates in the opposing through oil groove 11 and flows in an outer peripheral direction, while the lubricating oil that flows out of each through oil groove 11 concentrates locally along a spline 4a provided on the inner periphery of a drum 5 (second member) to which the separator plate 3 is spline-fitted, and flows axially out from one end of the drum 5. When the lubricating oil concentrates locally and flows in a single direction along the spline 4a in this manner, oil pressure is generated on the upstream side of the flow on the ridge portions of the spline formed on the separator plate 3 such that the separator plate 3 is brought into contact with the friction plate 7. Thus, as indicated by measurement data 50 shown in FIG. 11, drag torque is generated in accordance with the relative rotation between the friction plate 7 and separator plate 3. The reference numerals above, except for reference numeral 50, are the reference numerals used in Japanese Patent Application Publication No. JP-A-2000-145819.

The present invention thus provides, among other things, a friction engagement device in which lubricating oil, after cooling the friction materials of first annular plates, is dispersed in a circumferential direction over the outer periphery of second annular plates disposed alternately with the first annular plates so as to flow axially, whereby the generation of oil pressure acting on the second annular plates is suppressed by the axial lubricating oil flow, and drag torque is reduced.

According to a first exemplary aspect of the invention, a friction engagement device includes a rotatable, annular first member formed with a concavo-convex spline on an outer periphery thereof, into which a plurality of lubricating oil supply holes are drilled radially; a second member disposed on an outer peripheral side of, and coaxially with, the first member and formed with a concavo-convex spline on an inner periphery thereof; a plurality of first annular plates having friction materials adhered to front and rear surfaces thereof and a plurality of lubricating oil grooves provided therein so as to penetrate radially, the first annular plates being fitted to the first member by a concavo-convex spline formed on an inner periphery thereof; and a plurality of second annular plates disposed alternately with the first annular plates and fitted to the second member by a concavo-convex spline formed on an outer periphery thereof, the second annular plates being capable of coming into contact with and separating from the friction materials, wherein the lubricating oil supply holes are drilled into the spline of the first member, and for each spline to which each of the lubricating oil supply holes corresponds, the lubricating oil grooves provided in the plurality of first annular plates do not overlap the splines on at least one of the front and rear surfaces of the first annular plates.

BRIEF DESCRIPTION OF THE DRAWINGS

Various exemplary embodiments of the invention will be described with reference to the drawings, wherein.

Figure 5:
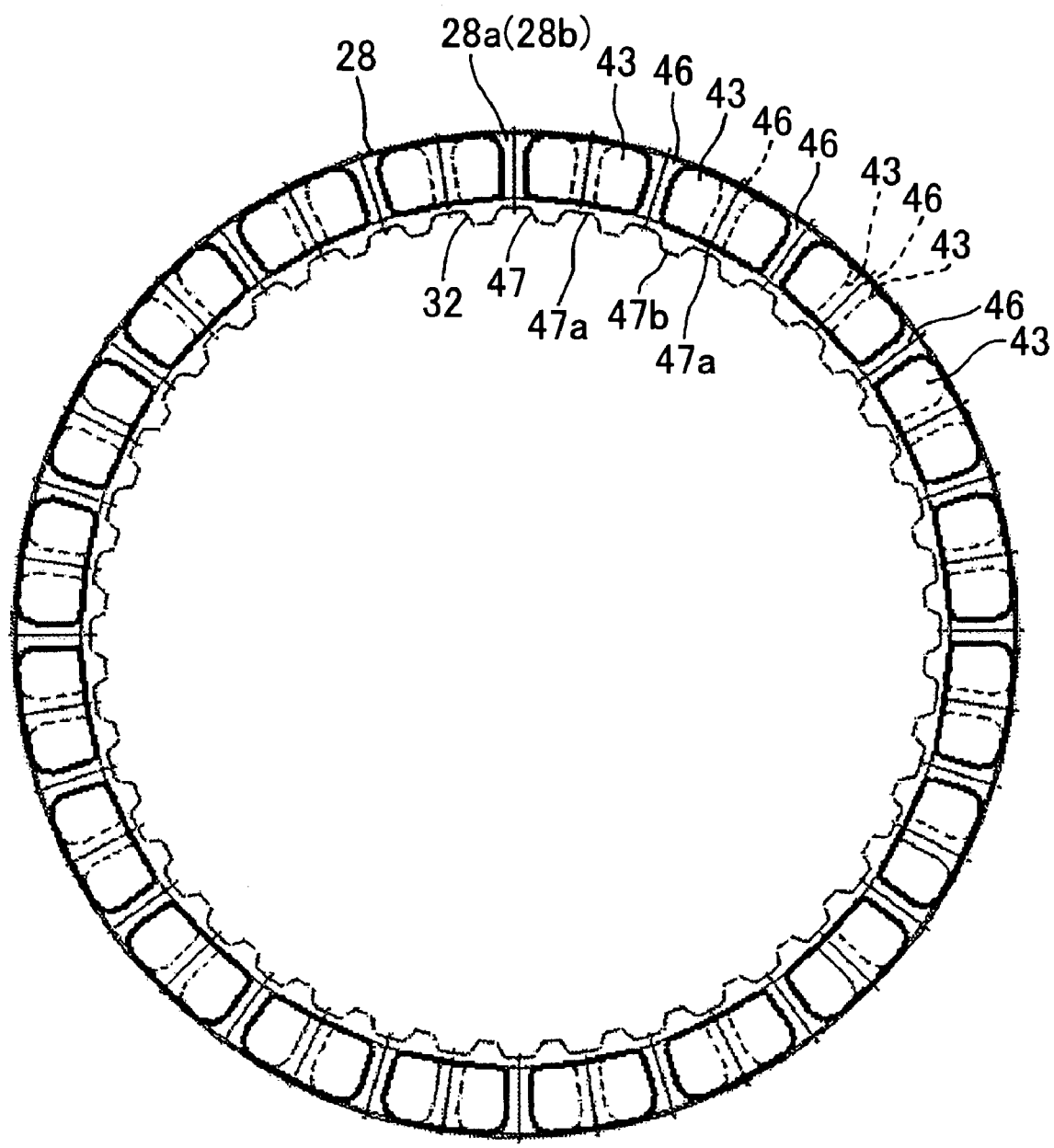
FIG. 5 is a front view showing a friction plate in which lubricating oil grooves provided in a front surface are disposed in the center of adjacent lubricating oil grooves provided in a rear surface.
Figure 7:
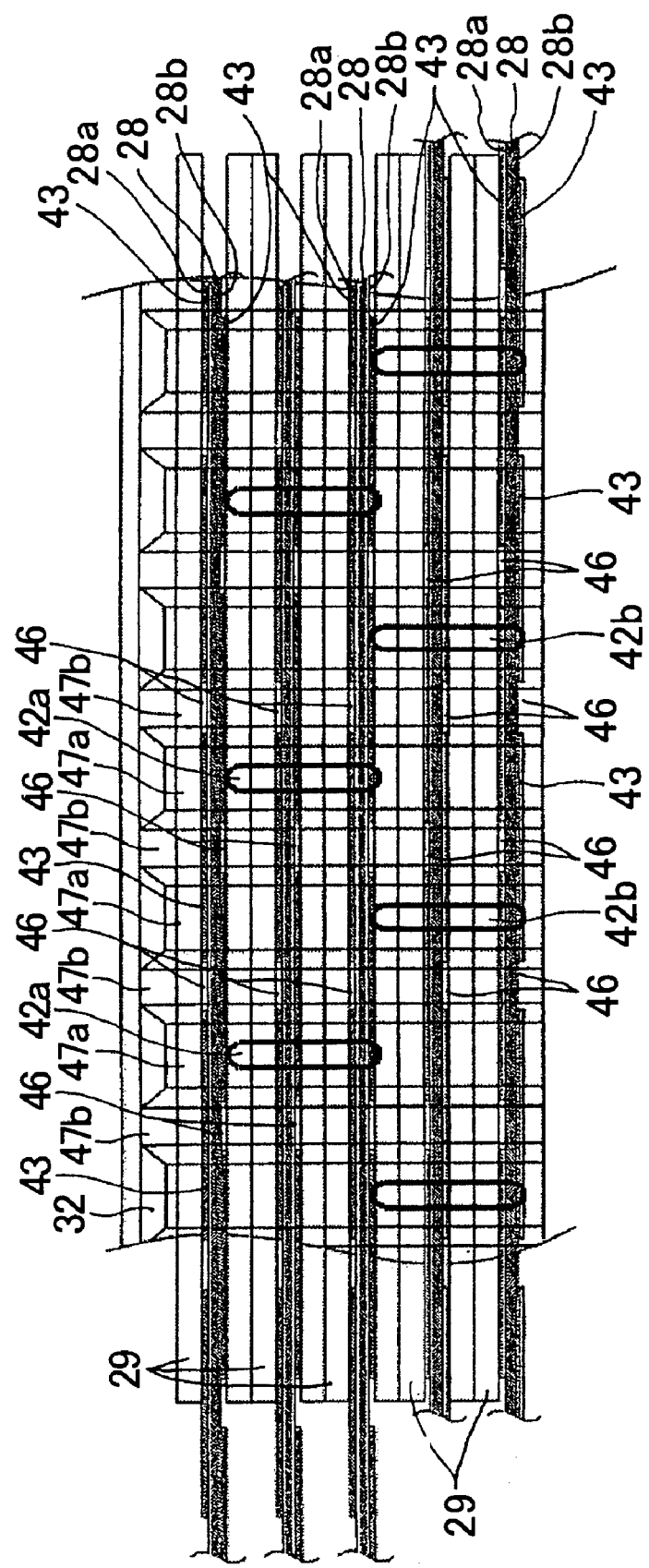
Figure 8:
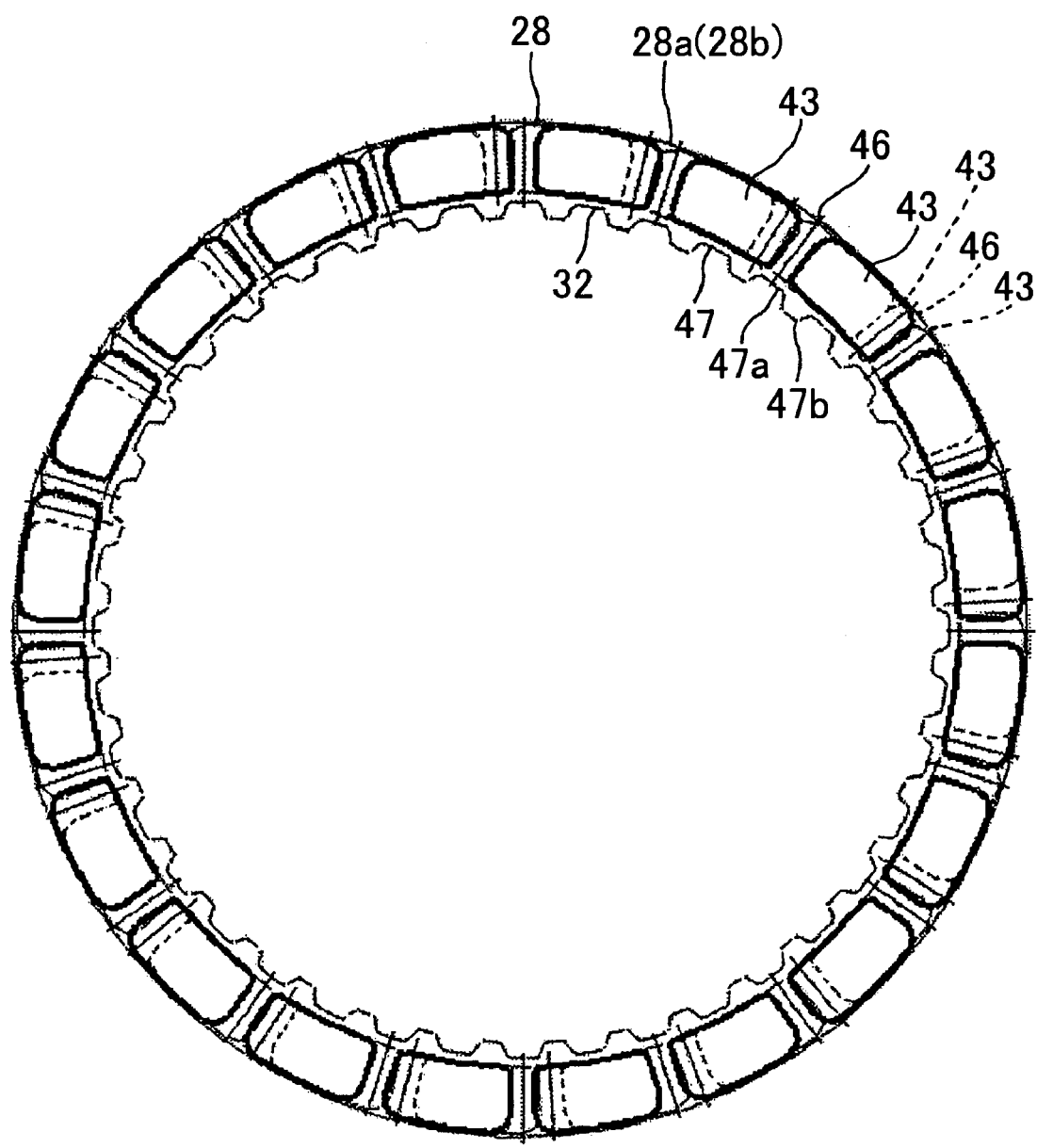
Figure 9:
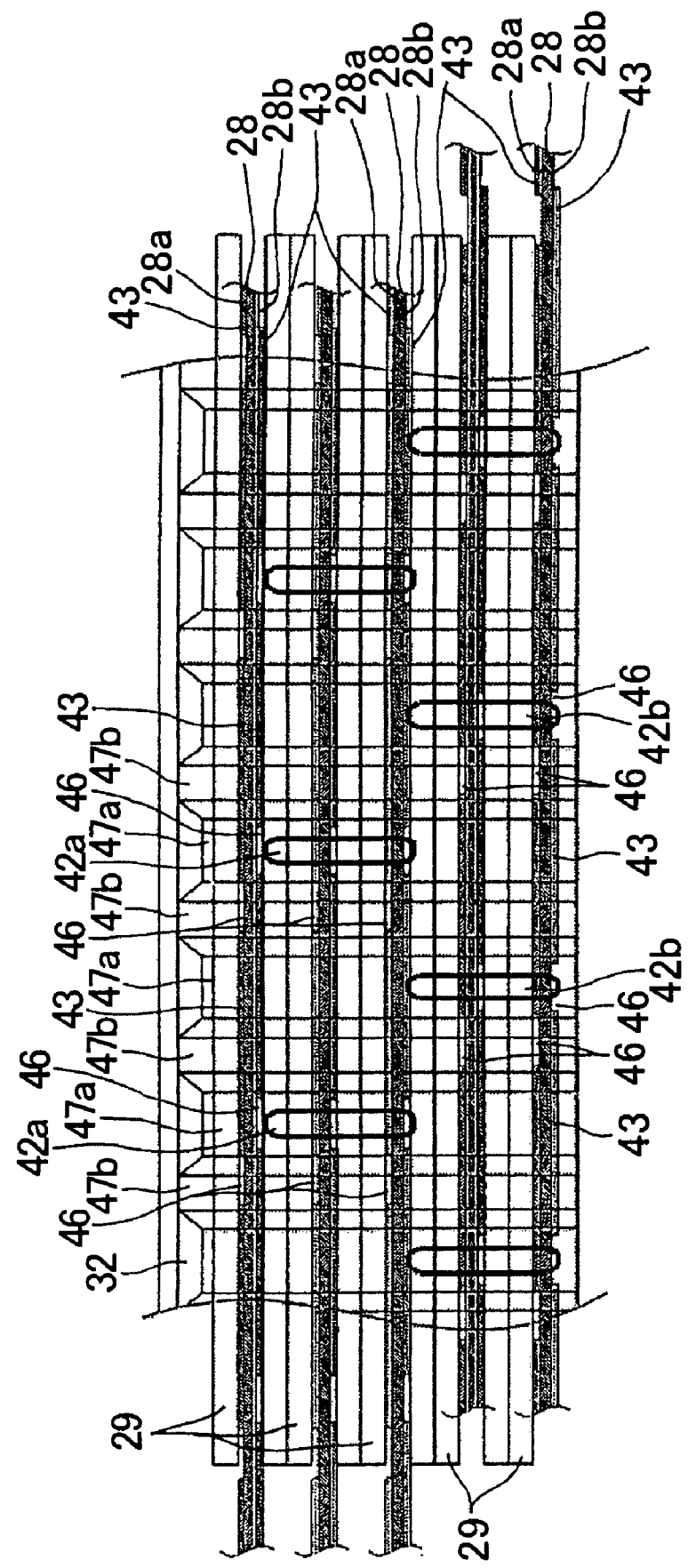
Figure 10:
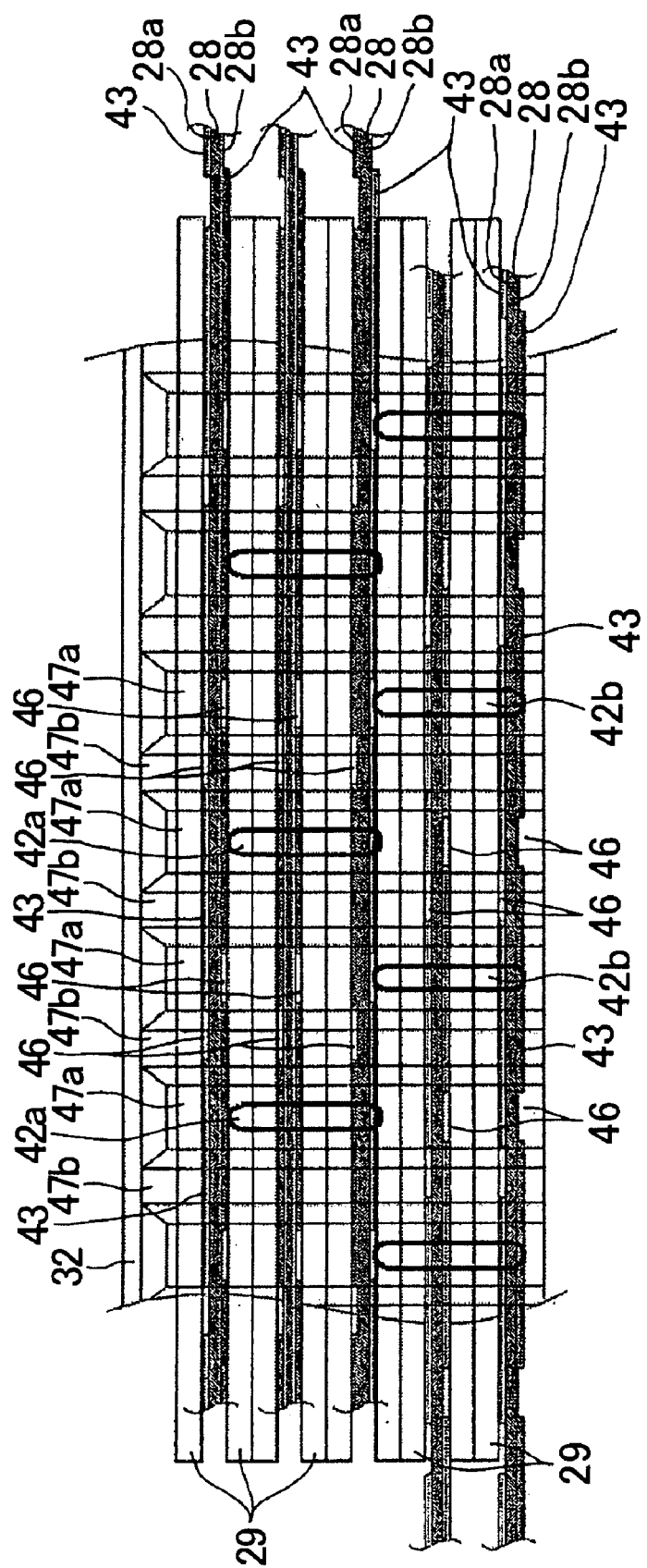
Figure 11:
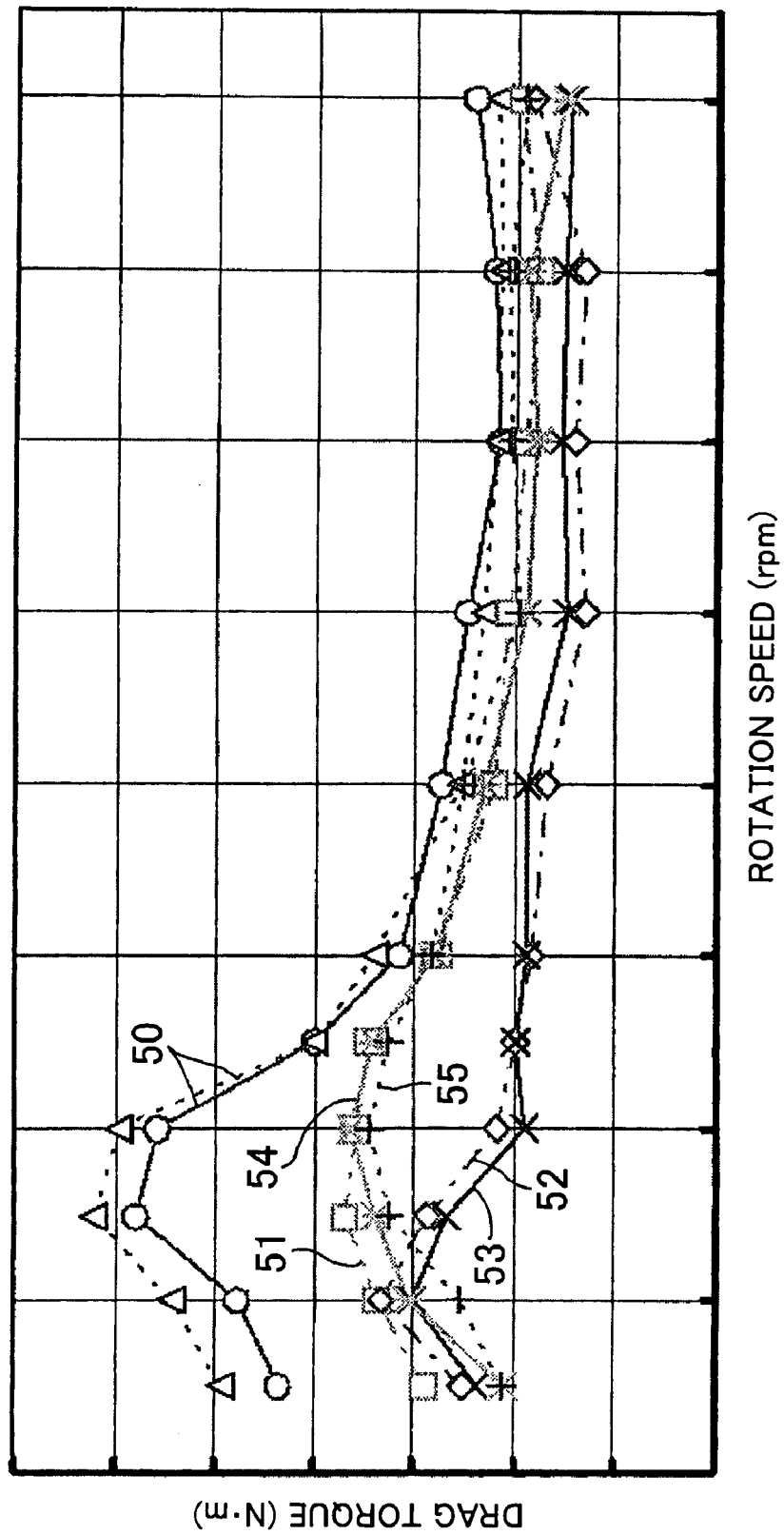
Figure 12:
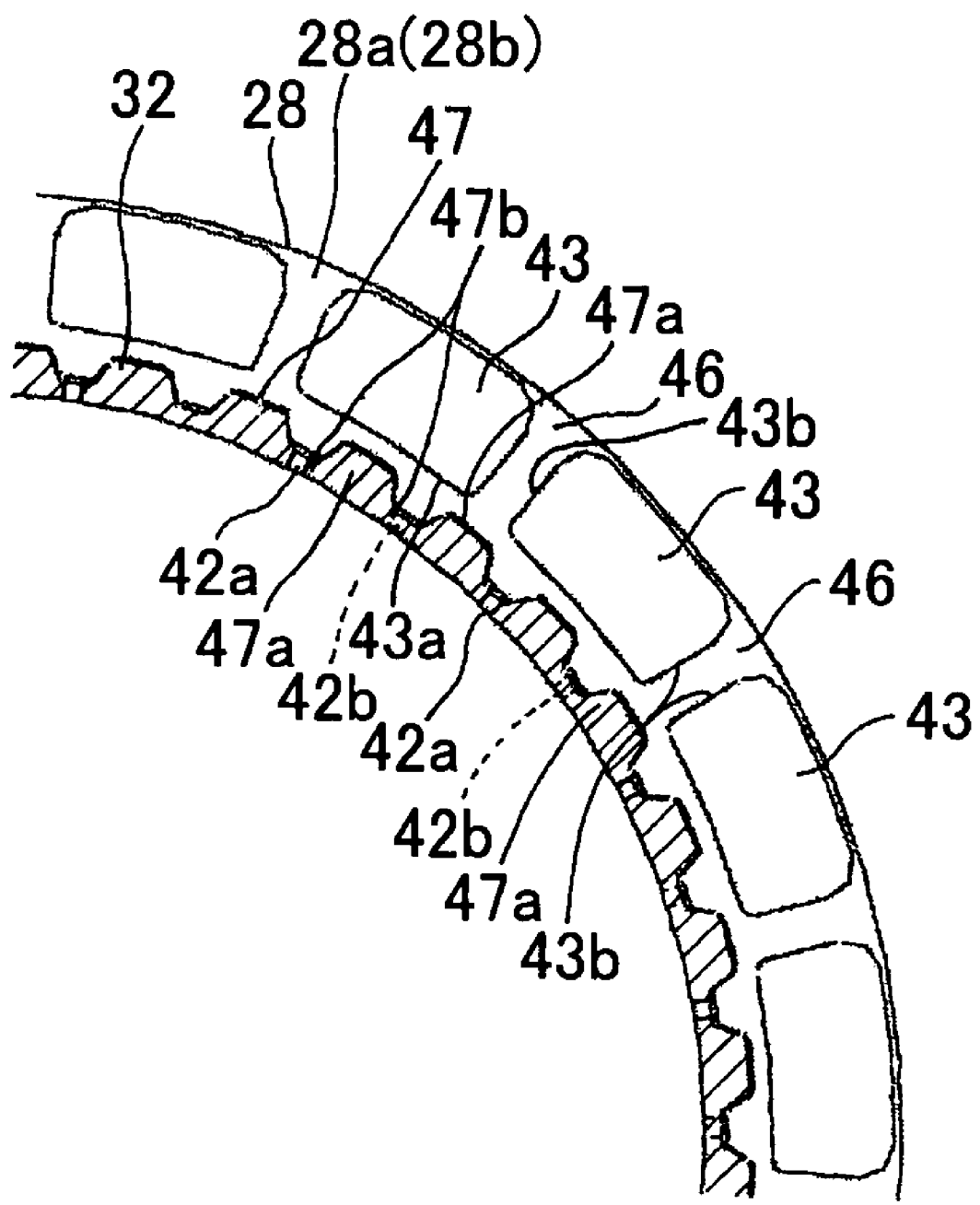

5 overlap lubricating oil supply holes and the lubricating oil grooves in the rear surface do not overlap the lubricating oil supply hole;

FIG. 7 is a view showing a case in which none of the lubricating oil grooves in the front and rear surfaces of the friction plate shown in FIG. 5 overlap the lubricating oil supply holes;

FIG. 8 is a front view showing a friction plate in which a rear side surface of each friction material adhered to the front surface matches a front side surface of each friction material adhered to the rear surface;

FIG. 9 is a view showing a case in which the lubricating oil grooves in the front surface of the friction plate shown in FIG. 8 overlap lubricating oil supply holes and the lubricating oil grooves in the rear surface do not overlap the lubricating oil supply holes;

FIG. 10 is a view showing a case in which none of the lubricating oil grooves in the front and rear surfaces of the friction plate shown in FIG. 8 overlap the lubricating oil supply holes;

FIG. 11 is a view showing measurement data relating to drag torque generated in accordance with a relative rotation speed between the friction plate and a separator plate; and FIG. 12 is a view showing a hub in which a spline has been cut into the outer peripheral surface.

DETAILED DESCRIPTION OF EMBODIMENTS

Figure 1:
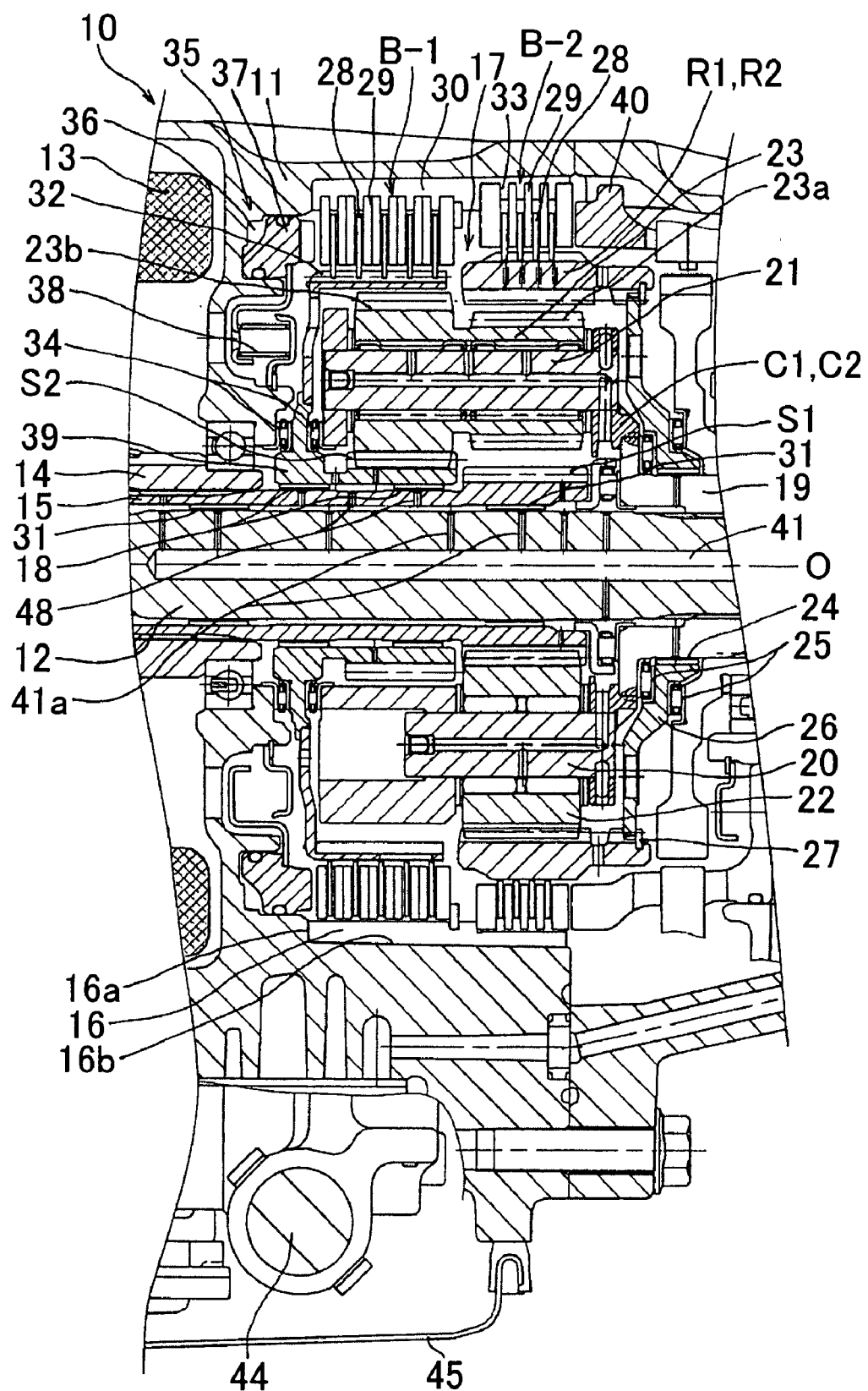
FIG. 1 is a view showing a part of an automatic transmission having a friction engagement device according to an embodiment of the invention.

Embodiments of a friction engagement device according to the present invention will be described below, in relation to a brake used in an automatic transmission of a hybrid vehicle, on the basis of the drawings. In FIG. 1, reference numeral 10 denotes an automatic transmission of a hybrid vehicle. In a housing 11, a drive shaft 12, connected to an engine via a damper (not shown), is supported rotatably on an axis O. A cylindrical input shaft 15, connected to an output shaft 14 of an electric motor 13, is supported rotatably on the drive shaft 12 via a metal bearing 31. A storage hole 16 having a base is formed in the housing 11, and a compound planetary gear 17 and first and second brakes B-1, B-2, which together comprise the automatic transmission 10, are stored coaxially in the storage hole 16 on an outer peripheral side of the input shaft 15.

A first sun gear S1 of the compound planetary gear 17 is formed at the rear end of the input shaft 15, and a second sun gear S2 is supported rotatably on the input shaft 15 in series with the first sun gear S1 by two metal bearings 18. Common carriers C1, C2 are fixed to an output shaft 19 that is supported rotatably in the housing 11 on the axis O, and the output shaft 19 is coupled to the drive shaft 12. A pinion 22 and a stepped pinion 23 are supported rotatably by respective needle bearings on pinion shafts 20, 21 that are supported at both ends on the common carriers C1, C2. The pinion 22 meshes with the first sun gear S1 and common ring gears R1, R2. A small diameter pinion 23a of the stepped pinion 23 meshes with the pinion 22, and a large diameter pinion 23b meshes with the second sun gear S2. The common ring gears R1, R2 are fitted to the outer periphery of an annular circular plate body 26, which is supported on the output shaft 19 by a metal bearing 24 and a thrust bearing 25 so as to be capable of relative relation, through a stepped hole, and axial movement thereof is restricted by a snap ring 27.

The first and second brakes B-1, B-2 restrict rotation of the common ring gears R1, R2 and the second sun gear S2 by pressing a plurality of friction plates 28 and a plurality of separator plates 29, disposed alternately, against each other. The plurality of friction plates 28 of the second brake B-2 are spline-engaged with the outer peripheral surface of the common ring gears R1, R2, and the plurality of separator plates 29 are spline-engaged with a spline 33 formed in the storage hole 16 of the housing 11. The second brake B-2 is engaged and disengaged by a piston 40 of a hydraulic servo, not shown in the drawing.

The plurality of friction plates 28 of the first brake B-1 are spline-fitted to the outer peripheral surface of a rotatable hub 32 on the outside of the large diameter pinion 23b of the stepped pinion 23 about the axis O. The plurality of separator plates 29 are spline-fitted to a spline 30 formed in the storage hole 16 of the housing 11. The hub 32 is bent at one end so as to extend radially, and is joined integrally to a flange portion 39 formed on the second sun gear S2. The flange portion 39 is movement-restricted in the direction of the axis O by thrust bearings 34 interposed between the two end surfaces of the flange portion 39 and the bottom surface of the storage hole 16, and between the two end surfaces of the flange portion 39 and the front end surface of the common carriers C1, C2, respectively. A hydraulic servo 35 of the first brake B-1 is constituted by a cylinder 36 formed in the bottom portion of the storage hole 16 in the housing 11, a piston 37 disposed slidably in the cylinder 36, and a compression spring 38 for biasing the piston 37 in a direction for disengaging the friction plates 28 and separator plates 29.

Figure 2:
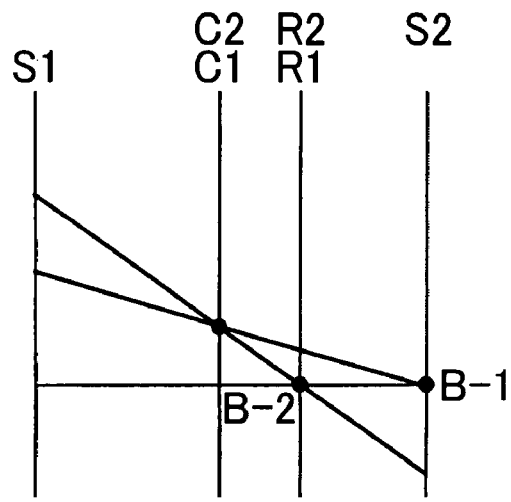
FIG. 2 is a view showing a speed diagram of the automatic transmission shown in FIG. 1.

In the automatic transmission 10, the output shaft 14 of the electric motor 13 is connected to the drive shaft 12 at a varied speed by selectively engaging and disengaging the first and second brakes B-1, B-2. When the first and second brakes B-1, B-2 are selectively engaged, the speed ratio of the various elements in the compound planetary gear 17 varies as shown in the speed diagram of FIG. 2. In the speed diagram, the various elements of the compound planetary gear 17, including the sun gears S1, S2, the common carriers C1, C2, and the common ring gears R1, R2, are disposed at intervals in the abscissa direction corresponding to the gear ratio, and the speed ratio is taken in accordance with each element in the abscissa direction. In the compound planetary gear 17, the carriers C1 and C2 and the ring gears R1 and R2 of a single pinion planetary gear and a double pinion planetary gear are shared, and therefore, the speed ratio of the common carriers C1, C2 and the common ring gears R1, R2 are expressed on single vertical lines denoted as C1, C2, and R1, R2, respectively. In the speed diagram, B-1, B-2 are indicated at points where the first and second brakes B-1, B-2 are selectively engaged.

Hence, when the first and second brakes B-1, B-2 are disengaged, the output shaft 14 of the electric motor rotates freely. When the second brake B-2 is engaged, the output shaft 14 is connected to the drive shaft 12 at a low speed ratio greater than 1, and when the first brake B-1 is engaged, the output shaft 14 is connected to the drive shaft 12 at a high speed ratio greater than the low speed ratio.

A lubricating oil path 41 for supplying lubricating oil to each portion is drilled into the drive shaft 12, and from the lubricating oil path 41, small diameter lubricating oil paths 41a are drilled radially so as to open onto the outer peripheral surface of the drive shaft 12. The lubricating oil that is supplied through the lubricating oil path 41 flows to the outer periphery of the drive shaft 12 through the lubricating oil paths 41a, passes through a lubricating oil path 48 drilled radially into the input shaft 15, and flows into the interior of the compound planetary gear 17. Note that a part of the lubricating oil that is supplied through the lubricating oil paths 41a, 48 lubricates the metal bearings 18, 24, 31 and the thrust bearings 25, 34.

After flowing into the interior of the compound planetary gear 17, the lubricating oil lubricates the meshing parts of each gear, and also lubricates the needle bearings for supporting the pinion 22 and stepped pinions 23 on the pinion shafts 20, 21. After flowing into the inner periphery of the hub 32 supported in the housing 11, the lubricating oil flows out through a plurality of lubricating oil supply holes 42a, 42b drilled radially into the hub 32, and then flows from the inner periphery of each friction plate 28 of the first brake B-1 toward the outer periphery, thereby cooling friction materials 43 adhered to both the front and rear surfaces of the friction plates 28. Having cooled the friction materials 43 and after flowing out to the outer periphery of the friction plates 28, the lubricating oil flows in one direction of the axis O along the spline 30 formed in the storage hole 16 of the housing 11, and is then collected in an oil pan 45 fixed to the lower surface of the automatic transmission 10.

In this embodiment, the lubricating oil is prevented from flowing forward by a bottom surface 16a serving as one end of the storage hole 16 adjacent to the first brake B-1, and therefore, after cooling the friction materials 43 and flowing to the outer periphery of the friction plates 28, the lubricating oil flows axially toward an opening at the rear end of the storage hole 16, which is provided at the rear end of the storage hole 16 for permitting the lubricating oil to flow rearward. A lower side peripheral wall 16b of the storage hole 16 serves as a partition wall between the storage hole 16 and an oil pressure control device 44 for supplying and discharging working oil to and from the hydraulic servo 35 of the first brake B-1 and so on. A large number of oil paths are provided in the lower side peripheral wall 16b, and therefore, a discharge hole for discharging the lubricating oil to the oil pan 45 after cooling the friction materials 43 and flowing to the outer periphery of the friction plates 28 cannot be drilled into the lower side peripheral wall 16b. Hence, all of the lubricating oil that flows to the outer periphery of the friction plates 28 flows in one direction of the axis O along the spline 30 formed in the storage hole 16, flows out through the opening in the rear end of the storage hole 16, and is collected in the oil pan 45 therebeneath.

Figure 3:
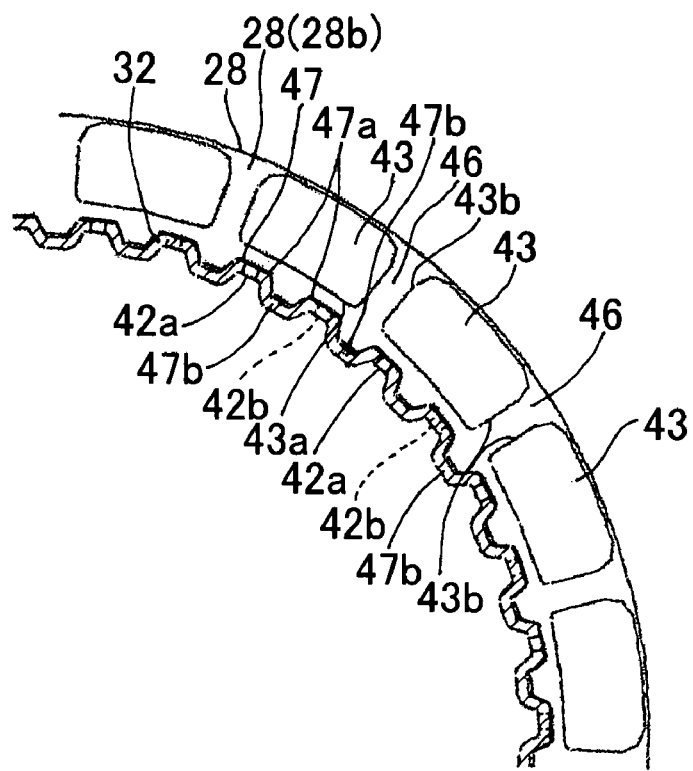
FIG. 3 is a front view showing a part of a hub and a friction plate of a friction engagement device according to a first embodiment.

As shown in FIG. 3, front and rear surfaces 28a, 28b of each friction plate 28 are adhered with the friction materials 43 and provided with a plurality of lubricating oil grooves 46 that penetrate the friction plate 28 radially. In other words, the plurality of friction materials 43 are adhered to the front and rear surfaces 28a, 28b of each friction plate 28 at equal intervals in a circumferential direction, and the lubricating oil grooves 46 are formed between adjacent friction materials 43 so as to penetrate the friction plate 28 radially.

By causing the plurality of lubricating oil supply holes 42a, 42b to overlap and face the plurality of lubricating oil grooves 46 in the circumferential direction, the lubricating oil that flows out through each lubricating oil supply hole 42a, 42b gathers in the opposing lubricating oil groove 46 and flows in an outer peripheral direction, while the lubricating oil that flows out of each lubricating oil groove 46 gathers locally and flows axially along the splines 30 provided on the inner periphery of the storage hole 16, and is then collected through the rear end opening of the storage hole 16. When the lubricating oil gathers locally and flows in a single direction along the splines 30 in this manner, oil pressure is generated on the upstream side of the flow at a spline ridge portion formed on the separator plate 29, and as a result, the separator plate 29 comes into contact with the friction plate 28 leading to an increase in drag torque.

Figure 4:
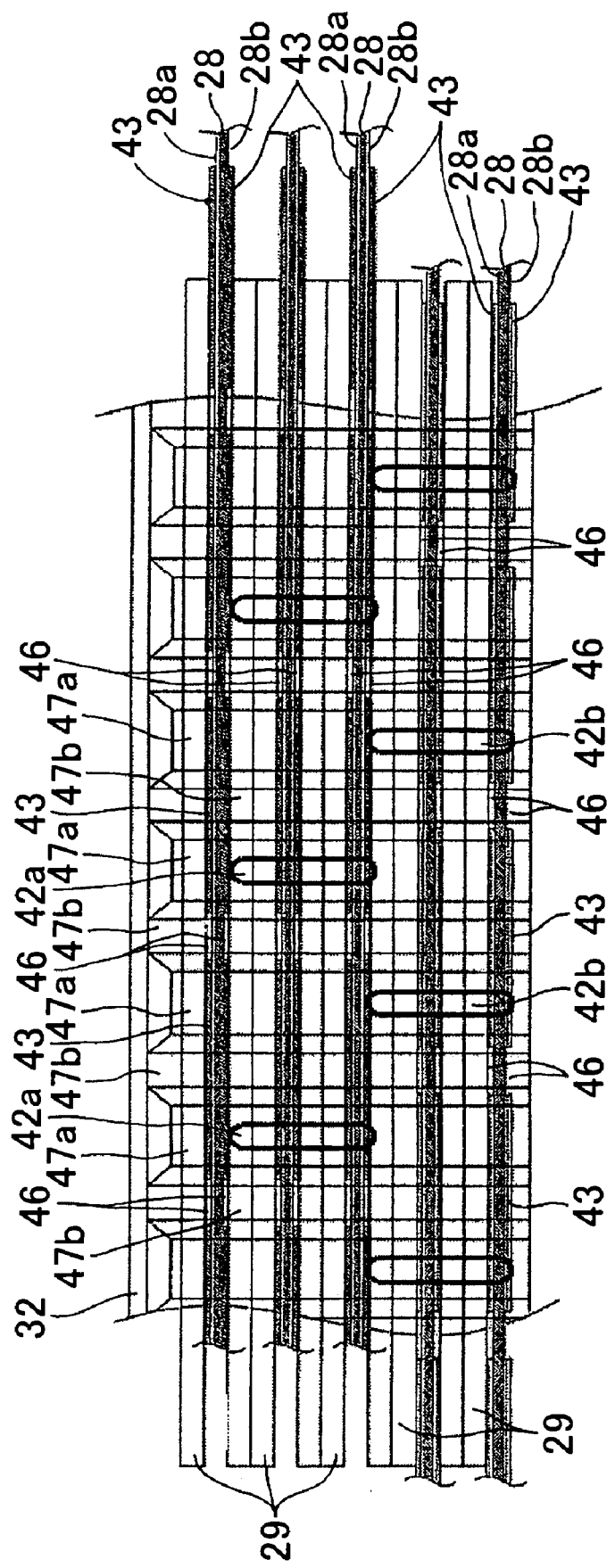
FIG. 4 is an expanded view of FIG. 3.

To prevent this, in the first embodiment shown in FIGS. 1, 3, and 4, the plurality of lubricating oil supply holes 42a, 42b are drilled radially into the hub 32, which serves as an example of a first member supported rotatably on the housing 11, and the plurality of lubricating oil grooves 46 are provided in phase in the circumferential direction in the front and rear surfaces 28a, 28b of the friction plate 28, which serves as an example of a first annular plate. The storage hole 16 of the housing 11, which serves as an example of a second member, is disposed on the outer peripheral side of, and on the same O axis as, the hub 32, and the storage hole 16 stores the plurality of friction plates 28 and the plurality of separator plates 29 disposed alternately with the friction plates 28. The separator plate 29, which serves as an example of a second annular plate, is spline-fitted to the splines 30 formed in the storage hole 16 so as to be capable of contacting the friction materials 43 adhered to the friction plate 28. When the friction plates 28 are each spline-fitted to the hub 32, none of the plurality of lubricating oil grooves 46 overlap the lubricating oil supply holes 42 drilled into the hub 32 in the circumferential direction.

More specifically, the hub 32 is formed by pressing a cylinder made of iron plate into a wave form such that a spline 47 is formed on the outer peripheral surface thereof in the direction of the O axis, and the plurality of friction plates 28 are spline-fitted to the spline 47. The plurality of friction materials 43 are adhered in phase to the front and rear surfaces 28a, 28b of each friction plate 28 such that when each friction plate 28 is spline-fitted to the hub 32, an inner surface 43a of each friction material 43 faces two ridge portions 47a of the spline 47, and each of the lubricating oil grooves 46 formed between side faces 43b of adjacent friction materials 43 faces every second trough portion 47b of the spline 47. As shown in FIG. 4, lubricating oil supply holes 42a, 42b are drilled into the ridge portion 47a of the spline 47 of the hub 32 radially and in staggered form. More specifically, one lubricating oil supply hole 42a is drilled into one of adjacent ridge portions 47a of the spline 47 from an axial central part of the hub 32 toward one end, while another lubricating oil supply hole 42b is drilled into the other ridge portion 47a from the axial central part of the hub 32 toward the other end. Note that the front and rear surfaces 28a, 28b of the friction plate 28 are identical, but are differentiated as the front surface 28a and the rear surface 28b in the drawings for ease of description.

Thus, the lubricating oil, having flowed out through the lubricating oil supply holes 42a, 42b, is dispersed in the circumferential direction and flows from the inner periphery to the outer periphery of each friction plate 28, rather than gathering in the lubricating oil grooves 46 and flowing in the outer peripheral direction. Then, after cooling the friction materials 43 and flowing to the outer periphery of the friction plate 28, the lubricating oil is dispersed in the circumferential direction so as to flow axially along the splines 30 formed in the storage hole 16. As a result, a force generated by the axial lubricating oil flow, which acts in a direction for causing the separator plate 29 to contact the friction materials 43 of the friction plate 28, is suppressed, and drag torque is reduced as shown by measurement data 51 in FIG. 11. Furthermore, the plurality of lubricating oil grooves 46 are provided in the front and rear surfaces 28a, 28b of each friction plate 28 in phase in the circumferential direction, and therefore the friction materials 43 can be adhered to the friction plates 28 easily. Moreover, when the friction plates 28 are spline-fitted to the hub 32, none of the lubricating oil grooves 46 overlap the lubricating oil supply holes 42a, 42b in the circumferential direction, and therefore each friction plate 28 can be attached easily to the hub 32 through spline fitting without the need for phase alignment in the rotational direction.

Next, a second embodiment, in which the plurality of friction materials 43 are adhered to the front and rear surfaces 28a, 28b of each friction plate at an offset phase in the circumferential direction to ensure that the lubricating oil grooves 46 provided on the front surface 28a of each friction plate 28 and the lubricating oil grooves 46 provided on the rear surface 28b of each friction plate 28 do not overlap in groove width in the circumferential direction, will be described. In this case, similarly to the first embodiment, the lubricating oil supply holes 42a, 42b are drilled into the ridge portions 47a of the spline 47 of the hub 32 radially and in staggered form.

As shown in FIG. 5, when the lubricating oil grooves 46 provided on the front surface 28a of each friction plate 28 and the lubricating oil grooves 46 provided on the rear surface 28b of each friction plate 28 do not overlap in groove width in the circumferential direction, the phase offset in the circumferential direction between the lubricating oil grooves 46 on the front surface 28a and the lubricating oil grooves 46 on the rear surface 28b reaches a maximum when each of the lubricating oil grooves 46 on the front surface 28a are disposed in a central portion between adjacent lubricating oil grooves on the rear surface 28b. In other words, the phase offset reaches a maximum when the plurality of friction materials 43 are adhered to the front and rear surfaces 28a, 28b of the friction plate 28 such that the lubricating oil grooves 46 formed between adjacent friction materials 43 on the front surface 28a are positioned in the center of each friction material 43 on the rear surface 28b.

Figure 6:
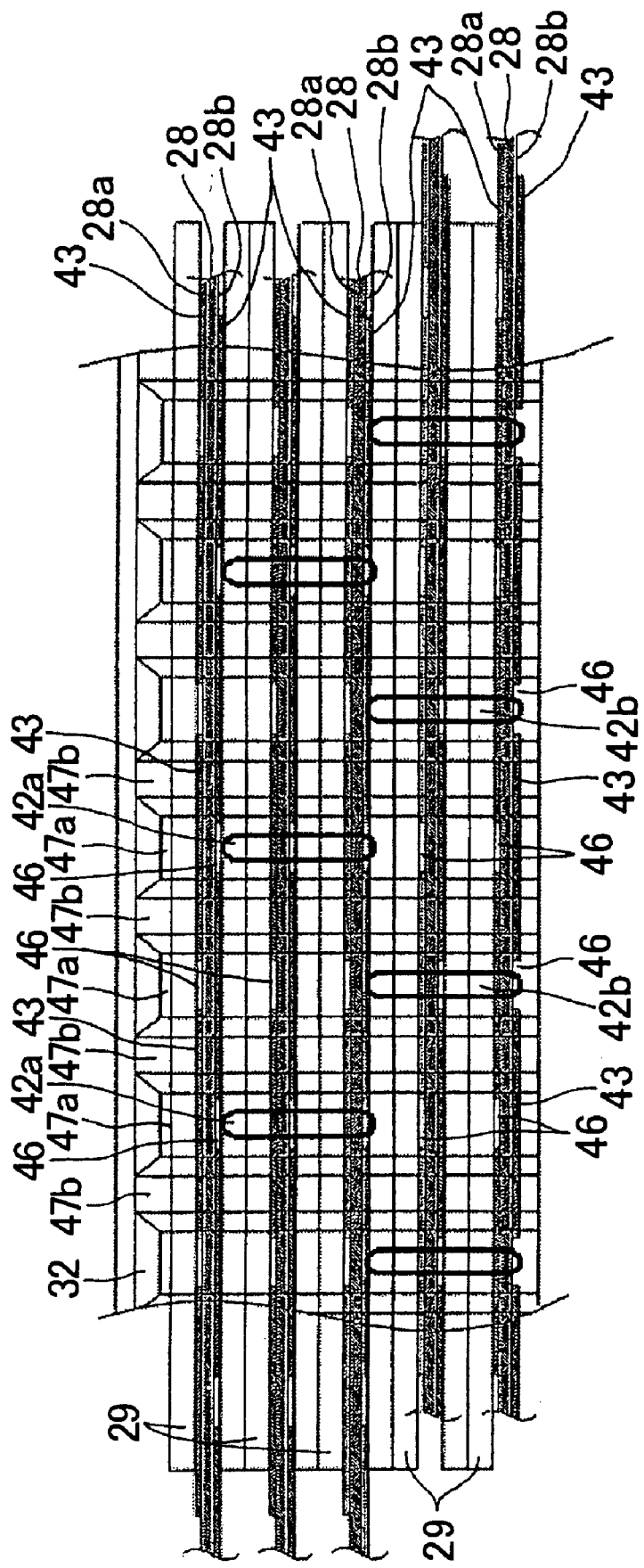
FIG. 6 is a view showing a case in which the lubricating oil grooves in the front surface of the friction plate shown in FIG.

In the case shown in FIG. 6, the circumferential direction phase offset between the lubricating oil grooves 46 on the front surface 28a and the lubricating oil grooves 46 on the rear surface 28b is at a maximum. The plurality of friction materials 43 are adhered to the front and rear surfaces 28a, 28b of each friction plate 28 by determining the circumferential direction phase thereof relative to the friction plates 28 that are spline-fitted to the hub 32 such that when each friction plate 28 is spline-fitted to the hub 32, none of the plurality of lubricating oil grooves 46 provided on the front surface 28a of each friction plate 28 overlap the lubricating oil supply holes 42a, 42b in the circumferential direction, and all of the plurality of lubricating oil grooves 46 provided on the rear surface 28b overlap the lubricating oil supply holes 42a, 42b in the circumferential direction.

In the case shown in FIG. 7, the circumferential direction phase offset between the lubricating oil grooves 46 on the front surface 28a and the lubricating oil grooves 46 on the rear surface 28b is at a maximum. The plurality of friction materials 43 are adhered to the front and rear surfaces 28a, 28b of each friction plate 28 by determining the circumferential direction phase thereof relative to the friction plates 28 that are spline-fitted to the hub 32 such that when each friction plate 28 is spline-fitted to the hub 32, none of the plurality of lubricating oil grooves 46 provided on the front and rear surfaces 28a, 28b of each friction plate 28 overlap the lubricating oil supply holes 42a, 42b in the circumferential direction.

In both of the cases shown in FIGS. 6 and 7, the lubricating oil grooves 46 provided on the front surface 28a of each friction plate 28 are disposed in a central portion between adjacent lubricating oil grooves 46 provided on the rear surface 28b, and none of the lubricating oil grooves 46 on the front surface 28a overlap the lubricating oil grooves 46 on the rear surface 28b in groove width in the circumferential direction. As a result, the lubricating oil grooves 46 provided on at least one of the front and rear surfaces 28a, 28b of all of the friction plates 28 do not overlap the lubricating oil supply holes 42a, 42b in the circumferential direction, and therefore the lubricating oil that flows out of the lubricating oil supply holes 42a, 42b is dispersed in the circumferential direction in a well-balanced fashion and flows from the inner periphery to the outer periphery of the friction plate 28, rather than gathering in the lubricating oil grooves 46 and flowing in the outer peripheral direction. After cooling the friction materials 43 and flowing to the outer periphery of the friction plate 28, the lubricating oil is dispersed in the circumferential direction and flows axially along the splines 30 formed in the storage hole 16, and therefore the force generated by the axial lubricating oil flow, which acts in a direction for causing the separator plate 29 to contact the friction materials 43 of the friction plate 28, is suppressed, and drag torque is reduced as shown by measurement data 52, 53 in FIG. 11.

In both of the cases shown in FIGS. 6 and 7, drag torque is reduced by a substantially identical degree, as is evident from the measurement data 52, 53 shown in FIG. 11. As can be seen from these data, as long as the lubricating oil grooves 46 provided on at least one of the front and rear surfaces 28a, 28b do not overlap the lubricating oil supply holes 42a, 42b in the circumferential direction, drag torque is reduced, regardless of the extent to which the lubricating oil grooves 46 provided on the other surface side overlap the lubricating oil supply holes 42a, 42b in the circumferential direction.

As shown in FIG. 8, in a case where the lubricating oil grooves 46 provided on the front surface 28a of each friction plate 28 and the lubricating oil grooves 46 provided on the rear surface 28b of each friction plate 28 do not overlap in groove width in the circumferential direction, the circumferential direction phase offset between the lubricating oil grooves 46 on the front surface 28a and the lubricating oil grooves 46 on the rear surface 28b is at a minimum when one side surface of the lubricating oil grooves 46 on the front surface 28a matches the other surface side of the lubricating oil grooves 46 on the rear surface 28b. In other words, the circumferential direction phase offset is at a minimum when the plurality of friction materials 43 are adhered to the front and rear surfaces 28a, 28b of the friction plates 28 by matching the rear side surface of each friction material 43 on the front surface 28a to the front side surface of each friction material 43 on the rear surface 28b such that the lubricating oil grooves 46 formed between adjacent friction materials 43 on the front surface 28a overlap the friction materials 43 on the rear surface 28b.

In the case shown in FIG. 9, the circumferential direction phase offset between the lubricating oil grooves 46 on the front surface 28a and the lubricating oil grooves 46 on the rear surface 28b is at a minimum. The plurality of friction materials 43 are adhered to the front and rear surfaces 28a, 28b of each friction plate 28 by determining the circumferential direction phase thereof relative to the friction plates 28 that are spline-fitted to the hub 32 such that when each friction plate 28 is spline-fitted to the hub 32, none of the plurality of lubricating oil grooves 46 provided on the front surface 28a of each friction plate 28 overlap the lubricating oil supply holes 42a, 42b in the circumferential direction, and all of the plurality of lubricating oil grooves 46 provided on the rear surface 28b overlap the lubricating oil supply holes 42a, 42b in the circumferential direction.

In the case shown in FIG. 10, the circumferential direction phase offset between the lubricating oil grooves 46 on the front surface 28a and the lubricating oil grooves 46 on the rear surface 28b is at a minimum. The plurality of friction materials 43 are adhered to the front and rear surfaces 28a, 28b of each friction plate 28 by determining the circumferential direction phase thereof relative to the friction plates 28 that are spline-fitted to the hub 32 such that when each friction plate 28 is spline-fitted to the hub 32, none of the plurality of lubricating oil grooves 46 provided on the front and rear surfaces 28a, 28b of each friction plate 28 overlap the lubricating oil supply holes 42a, 42b in the circumferential direction.

In both of the cases shown in FIGS. 9 and 10, the lubricating oil grooves 46 provided on at least one of the front and rear surfaces 28a, 28b of all of the friction plates 28 do not overlap the lubricating oil supply holes 42a, 42b in the circumferential direction, and therefore the lubricating oil that flows out of the lubricating oil supply holes 42a, 42b is dispersed in the circumferential direction and flows from the inner periphery to the outer periphery of the friction plate 28, rather than gathering in the lubricating oil grooves 46 and flowing in the outer peripheral direction. After cooling the friction materials 43 and flowing to the outer periphery of the friction plate 28, the lubricating oil is dispersed in the circumferential direction and flows axially along the splines 30 formed in the storage hole 16, and therefore the force generated by the axial lubricating oil flow, which acts in a direction for causing the separator plate 29 to contact the friction materials 43 of the friction plate 28, is suppressed, and drag torque is reduced as shown by measurement data 54, 55 in FIG. 11.

In both of the cases shown in FIGS. 9 and 10, drag torque is reduced by a substantially identical degree, as is evident from the measurement data 54, 55 shown in FIG. 11. As can be seen from these data, as long as the lubricating oil grooves 46 provided on at least one of the front and rear surfaces 28a, 28b do not overlap the lubricating oil supply holes 42a, 42b in the circumferential direction, drag torque is reduced, regardless of the extent to which the lubricating oil grooves 46 provided on the other surface side overlap the lubricating oil supply holes 42a, 42b in the circumferential direction.

In all of the structures shown in FIGS. 6, 7, 9, and 10, drag torque is reduced considerably in comparison with the related art, as can be seen from the measurement data 52 through 55 shown in FIG. 11. Hence, when each of the lubricating oil grooves 46 provided on the front surface 28a of each friction plate 28 and each of the lubricating oil grooves 46 provided on the rear surface 28b of each friction plate 28 do not overlap in groove width in the circumferential direction, and the lubricating oil grooves 46 provided on at least one of the front and rear surfaces 28a, 28b do not overlap the lubricating oil supply holes 42a, 42b in the circumferential direction, drag torque is reduced. Regardless of the position in which, and the degree to which, the lubricating oil grooves 46 provided on the other surface side of the front and rear surfaces 28a, 28b overlap the lubricating oil supply holes 42a, 42b in the circumferential direction, and the position in which, and the degree to which, each of the friction materials 43 adhered to the front surface 28a of each friction plate 28 overlaps the lubricating oil grooves 46 formed between adjacent friction materials 43 adhered to the rear surface 28b, drag torque is reduced considerably in comparison with the related art.

Hence, a structure in which the lubricating oil grooves 46 provided on at least one of the front and rear surfaces 28a, 28b of each friction plate 28 do not overlap the lubricating oil supply holes 42a, 42b in the circumferential direction when each friction plate 28 is spline-fitted to the hub 32 is sufficient, and therefore the plurality of friction materials 43 need simply be disposed such that each of the lubricating oil grooves 46 provided on the front surface 28a of each friction plate 28 do not overlap each of the lubricating oil grooves 46 provided on the rear surface 28b in groove width in the circumferential direction. Accordingly, the plurality of lubricating oil grooves 46 need not be phase-aligned with the lubricating oil supply holes in the circumferential direction, and therefore the plurality of friction materials 43 can be adhered to the friction plates 28 easily.

In each of the embodiments described above, the hub 32 serves as an example of a rotatable, annular first member formed with a concavo-convex form spline on the outer periphery thereof, and into which the plurality of lubricating oil supply holes 42 are drilled radially. The housing 11 serves as an example of a second member disposed on the outer peripheral side of, and coaxially with, the first member and formed with a concavo-convex spline on the inner periphery thereof. The friction plates 28 serve as an example of a plurality of first annular plates having the friction materials 43 adhered to the front and rear surfaces thereof and the plurality of lubricating oil grooves 46 provided therein so as to penetrate radially, and are fitted to the first member by a concavo-convex spline formed on the inner periphery thereof. The separator plates 29 serve as an example of a plurality of second annular plates disposed alternately with the first annular plates and fitted to the second member by a concavo-convex spline formed on the outer periphery thereof, the front surfaces of the separator plates 29 being capable of coming into contact with and separating from the friction materials 43. The lubricating oil supply holes 42 are drilled into the ridge portion 47a or trough portion 47b of the hub 32, and of the splines to which each lubricating oil supply hole 42 corresponds, or in other words each ridge portion 47a or trough portion 47b into which each lubricating oil supply hole 42 is drilled, the lubricating oil grooves 46 provided in the plurality of friction plates 28 do not overlap the splines on at least one of the front and rear surfaces of the friction plates 28, or in other words each ridge portion 47a or trough portion 47b into which each lubricating oil supply hole 42 is drilled.

In the embodiment described above, the spline 47 of the hub 32 is formed by pressing a cylindrical body made of iron plate into a wave form, but the spline 47 may be formed by cutting the outer peripheral surface of the cylindrical body, as shown in FIG. 12. In this case, the lubricating oil supply holes 42 are drilled into the thin trough portions 47b of the spline 47.

Further, in the embodiment described above, the lubricating oil supply holes 42a, 42b are drilled into the ridge portions 47a of the spline 47 of the hub 32 in staggered form. However, lubricating oil supply holes 42a, 42b extending from one end to the other end of the hub 32 may be drilled into each of the ridge portions 47a or trough portions 47b of the spline 47, or one lubricating oil supply hole 42a, 42b may be drilled into each of a plurality of the ridge portions 47a or trough portions 47b. Note that the lubricating oil supply holes 42, 42a, 42b may also be drilled into the tooth surface of the spline 47.

Also in the embodiment described above, the number of pairs 42a, 42b of the lubricating oil supply holes 42a, 42b is identical to the number of lubricating oil grooves 46 provided on either surface of the front and rear surfaces 28a, 28b of the friction plate 28, but one may be an integral multiple of the other.

The friction engagement device according to the embodiment described above is a brake, but the friction engagement device may be a clutch.

Also in the embodiment described above, each of the lubricating oil grooves 46 is provided in the opposing side faces 43b of adjacent friction materials 43 adhered to the friction plate 28. However, friction materials 43 having a lubricating oil groove 46 engraved in the front surface thereof may be adhered to the friction plate 28 such that the lubricating oil grooves 46 are provided in the front and rear surfaces 28a, 28b of the friction plate 28 so as to penetrate radially.

The friction engagement device according to the present invention is suitable for use in an automatic transmission which changes the speed of rotation input from an engine via a torque converter among a plurality of shift speeds, and outputs the rotation to a drive wheel of a vehicle.

A friction engagement device according to a first aspect is structured such that lubricating oil supply holes are drilled into a first member that is fitted to a plurality of first annular plates by a spline. Lubricating oil grooves provided in the plurality of first annular plates do not overlap splines on at least one of the front and rear surfaces of the first annular plates, from among splines to which each lubricating oil supply hole corresponds, and therefore lubricating oil flowing out of the lubricating oil supply holes is dispersed in a circumferential direction and flows from the inner periphery to the outer periphery of the first annular plates, rather than gathering in each lubricating oil groove and flowing in an outer peripheral direction. Hence, after cooling friction materials and flowing to the outer periphery of the first annular plates, the lubricating oil is dispersed in the circumferential direction and flows axially along a spline formed on a second member, and therefore a force generated by the axial lubricating oil flow, which acts in a direction for causing the second annular plates to contact the friction materials on the first annular plates, is suppressed, leading to a reduction in drag torque.

A friction engagement device according to a second aspect exhibits similar effects to the friction engagement device according to the first aspect, and is structured such that the plurality of lubricating oil grooves are provided in both the front and rear surfaces of each of the first annular plates in phase in a circumferential direction, whereby the friction materials can be adhered to the first annular plates easily. Moreover, when each of the first annular plates is fitted to the first member by the spline, none of the plurality of lubricating oil grooves overlap each of the splines to which each of the lubricating oil supply holes corresponds in the circumferential direction, and therefore the first annular plates can be attached to the first member easily by being spline-fitted to the first member, without the need for phase alignment in the rotary direction.

A friction engagement device according to a third aspect is structured such that none of the lubricating oil grooves provided in the front surface of each of the first annular plates overlap the lubricating oil grooves provided in the rear surface in groove width in the circumferential direction. Therefore, when each of the first annular plates is spline-fitted to the first member, the plurality of lubricating oil grooves provided on at least one of the front and rear surfaces of the plurality of first annular plates do not overlap the splines to which each of the lubricating oil grooves corresponds in the circumferential direction. As a result, drag torque can be reduced in a similar fashion to the friction engagement device according to the first aspect. Further, since the lubricating oil grooves provided in the front surface of each of the first annular plates do not overlap the lubricating oil grooves provided in the rear surface in groove width in the circumferential direction, the plurality of lubricating oil grooves can be provided in the first annular plates easily without the need for phase alignment in the circumferential direction relative to the lubricating oil supply holes.

A friction engagement device according to a fourth aspect is structured such that the lubricating oil grooves provided in the front surface of each of the first annular plates are disposed in a central portion between adjacent lubricating oil grooves of the plurality of lubricating oil grooves provided in the rear surface, and do not overlap the lubricating oil grooves provided in the rear surface in groove width in the circumferential direction. As a result, the lubricating oil that flows out of the lubricating oil supply holes is dispersed in a well-balanced fashion in the circumferential direction and flows from the inner periphery to the outer periphery of the first annular plates, thereby achieving similar effects to the friction engagement device according to the first aspect.

A friction engagement device according to a fifth aspect is structured such that the lubricating oil supply holes are drilled between adjacent lubricating oil grooves in the first annular plates from a central part of the first member toward one end and another end by varying the phase thereof in the circumferential direction. As a result, lubricating oil flows out evenly from the lubricating oil supply holes drilled in varying phases, and is dispersed so as to flow in the circumferential direction from the inner periphery to the outer periphery of the first annular plates disposed at one end side and the other end side of the first member, thereby achieving similar effects to the friction engagement device according to the first aspect.

A friction engagement device according to a sixth aspect is structured such that the lubricating oil supply holes are provided along a ridge portion or a trough portion of the spline formed in the first member, and therefore the lubricating oil supply holes can be formed easily. Moreover, the lubricating oil grooves provided in the first annular plates that are spline-fitted to the first member can be phase-aligned to the spline easily if necessary.

A friction engagement device according to a seventh aspect is structured such that the number of lubricating oil supply holes drilled into the first member and the number of lubricating oil grooves provided in either one of the front and rear surfaces of the first annular plates are set such that one is an integral multiple of the other. Therefore, the first annular plates can be attached to the first member easily through spline fitting, without the need for phase alignment in the rotary direction.

A friction engagement device according to an eighth aspect is structured such that a side wall for preventing the lubricating oil from flowing is provided in one axial end of a storage hole for storing the plurality of first annular plates and the plurality of second annular plates, and an opening allowing the lubricating oil to flow is provided in the other axial end. Therefore, after cooling the friction materials and flowing to the outer periphery of the first annular plates, the lubricating oil flows axially toward the opening in the storage hole along a spline formed in the storage hole to enable spline fitting to the second annular plates. Since the lubricating oil is dispersed in the circumferential direction, the force generated by the axial lubricating oil flow, which acts in a direction for causing the second annular plates to contact the friction materials on the first annular plates, is suppressed, leading to a reduction in drag torque.

What is claimed is:

1. A friction engagement device comprising:
   a rotatable, annular first member formed with a concavo-convex spline on an outer periphery thereof, into which a plurality of lubricating oil supply holes are drilled radially;
   a second member disposed on an outer peripheral side of, and coaxially with, the first member and formed with a concavo-convex spline on an inner periphery thereof;
   a plurality of first annular plates having friction materials adhered to front and rear surfaces thereof and a plurality of lubricating oil grooves provided therein on the front and rear surfaces so as to penetrate radially, the first annular plates being fitted to the first member by a concavo-convex spline formed on an inner periphery thereof; and a plurality of second annular plates disposed alternately with the first annular plates and fitted to the second member by a concavo-convex spline formed on an outer periphery thereof, the second annular plates being capable of coming into contact with and separating from the friction materials, wherein:

the lubricating oil supply holes are drilled into the spline of the first member, and for each spline to which each of the lubricating oil supply holes corresponds, the lubricating oil grooves provided in the plurality of first annular plates do not overlap the splines on at least one of the front and rear surfaces of each of the first annular plates, and the lubricating oil supply holes are provided in the first member alternately by varying the phase thereof in a circumferential direction such that the lubricating oil supply holes formed in one phase are drilled from an axial central part of the first member toward one end, and the lubricating oil supply holes formed in another phase are drilled from the axial central part of the first member toward another end.

2. The friction engagement device according to claim 1, wherein the plurality of lubricating oil grooves are provided in both the front and rear surfaces of each of the first annular plates in phase in the circumferential direction such that when each of the first annular plates is fitted to the first member by the spline, none of the plurality of lubricating oil grooves overlap each of the splines to which the lubricating oil supply holes correspond in the circumferential direction.

3. The friction engagement device according to claim 1, wherein none of the lubricating oil grooves provided in the front surface of each of the first annular plates overlap the lubricating oil grooves provided in the rear surface in groove width in the circumferential direction so that the lubricating oil grooves do not overlap each of the lubricating oil supply holes in the radial direction on at least one of the front and rear surfaces of each of the first annular plates.

4. The friction engagement device according to claim 3, wherein the lubricating oil grooves provided in the front surface of each of the first annular plates are disposed in a central portion between adjacent lubricating oil grooves of the plurality of lubricating oil grooves provided in the rear surface.

5. The friction engagement device according to claim 1, wherein the lubricating oil supply holes are provided along at least one of a ridge portion and a trough portion of the spline formed in the first member to enable spline fitting to the first annular plates.

6. The friction engagement device according to claim 1, wherein a number of the lubricating oil supply holes and a number of the lubricating oil grooves provided in either one of the front and rear surfaces of the first annular plates are set such that one is an integral multiple of the other.

7. The friction engagement device according to claim 1, wherein:

the plurality of first annular plates and the plurality of second annular plates are stored in the second member, the second member comprises a storage hole formed with the spline to enable spline fitting to the second annular plates, a side wall for preventing the lubricating oil from flowing is provided at one axial end of the storage hole, and an opening allowing the lubricating oil to flow is provided at the other axial end of the storage hole.

8. The friction engagement device according to claim 1, wherein the friction materials are adhered in phase to at least one of the front and rear surfaces of each of the first annular plates such that when each of the first annular plates is spline-fitted to the first member, an inner surface of each of the friction materials faces two ridge portions of the spline of the first member, and each of the plurality of lubricating oil grooves formed between side faces of adjacent friction materials faces every second trough portion of the spline of the first member.

9. The friction engagement device according to claim 8, wherein one lubricating oil supply hole is drilled into one of the adjacent ridge portions of the spline from the axial central part of the first member toward one end, while another lubricating oil supply hole is drilled into the other ridge portion from the axial central part of the first member toward the other end.

10. The friction engagement device according to claim 1, wherein the friction engagement device is either a brake or a clutch.

11. An automatic transmission comprising the friction engagement device according to claim 1.

* * * * *